United States Patent [19]

Moroto et al.

[11] 4,367,661
[45] Jan. 11, 1983

[54] TRANSMISSION FOR FOUR-WHEEL DRIVE VEHICLES

[75] Inventors: Shuzo Moroto, Handa; Goichi Matsumoto, Okazaki; Yoichi Hayakawa, Toyoake, all of Japan

[73] Assignee: Aisin-Warner Kabushikikaisha, Aichi, Japan

[21] Appl. No.: 153,962

[22] Filed: May 28, 1980

[30] Foreign Application Priority Data

May 31, 1979 [JP] Japan .......................... 54-73402[U]

[51] Int. Cl.³ .................. F16H 37/06; F16H 57/02
[52] U.S. Cl. .......................... 74/665 GE; 74/665 G; 74/606 R
[58] Field of Search ........ 180/70 MS; 74/467, 606 R, 74/665 F, 665 GA, 665 GE, 740

[56] References Cited
U.S. PATENT DOCUMENTS

| | | | |
|---|---|---|---|
| 2,107,072 | 2/1938 | Herrington | 74/665 GA |
| 2,290,089 | 7/1942 | Bock | 74/665 GA X |
| 2,711,222 | 6/1955 | Bock | 74/665 GA |
| 2,802,554 | 8/1957 | Pringle | 74/665 GA X |
| 2,853,890 | 9/1958 | Kelbel | 74/740 X |
| 3,111,852 | 11/1963 | May et al. | 74/665 GA |
| 3,802,294 | 4/1974 | Smirl | 74/740 X |
| 3,955,442 | 5/1976 | Kessmar | 74/665 GE |
| 4,056,988 | 11/1977 | Kubo et al. | 74/740 X |
| 4,079,275 | 3/1978 | Fu | 74/467 X |
| 4,103,753 | 8/1978 | Holdeman | 180/70 R |
| 4,193,322 | 3/1980 | Morino | 74/606 R |
| 4,223,566 | 9/1980 | Yamamori et al. | 74/606 R |
| 4,270,409 | 6/1981 | Glaze et al. | 74/665 GA |

FOREIGN PATENT DOCUMENTS

| | | | |
|---|---|---|---|
| 970595 | 7/1975 | Canada | 74/665 GE |
| 1341326 | 9/1963 | France | 74/665 GA |

Primary Examiner—Leslie A. Braun
Assistant Examiner—Lawrence J. Gotts
Attorney, Agent, or Firm—Oblon, Fisher, Spivak, McClelland & Maier

[57] ABSTRACT

A transmission for four-wheel drive vehicles of the type having a four-wheel drive transfer disposed between the front transmission section having a gear train or a planetary gear train therein and the rear transmission section to which lubricating oil or hydraulic operating fluid is to be introduced, the improvement comprising a wet type or multi-plate clutch for the four-wheel drive transfer which permits a smooth switching over between a two-wheel drive mode and a four-wheel drive mode while the vehicle is cruising, and further comprising a fluid path which connects between the bottom of the rear transmission section and the front transmission section and through which the lubricating oil or hydraulic operating oil in the rear transmission section can be smoothly returned to the oil pan located under the rear transmission section.

1 Claim, 3 Drawing Figures

TRANSMISSION FOR FOUR-WHEEL DRIVE VEHICLES

BACKGROUND OF THE INVENTION

The present invention relates to a transmission for four-wheel drive vehicles, and more particularly to an improvement thereto which permits a smooth switching-over between the two-wheel drive mode and four-wheel drive mode while the vehicle is running, and which further permits a circulation of lubricating oil or hydraulic fluid between the front and rear transmission sections.

In a conventional four-wheel drive automobile, a switching-over between the two-wheel drive mode and four-wheel drive mode is accomplished by means of the gear clutch, and it is therefore necessary to bring the vehicle to a standstill or rest before a smooth switching-over can be achieved. In the conventional four-wheel drive automobile, the front transmission section is provided on the side of the engine, and adjacent to the transmission section is provided a transfer for the four-wheel drive which comprises two output shafts, clutch and links. Furthermore, behind the transfer is provided the rear transmission section to which lubricating oil or hydraulic operating fluid is to be applied and introduced. The transfer is isolated by a partition from the front and rear transmission sections. The transfer case in which the transfer is housed is radially larger, and its bottom is usually located lower than the that of a casing which houses the front and rear transmission sections. An oil tank is provided under the bottom of the front transmission section, and oil from the tank is fed by an oil pump to the two sections of the transmission. When the lubricating oil or hydraulic operating oil drained from the rear transmission section, among others, is returned to the oil tank, it is difficult for the oil to flow back to the tank smoothly or the oil tends to stay in the transfer case because the above-mentioned partition in the transfer prevents the flow of the oil.

SUMMARY OF THE INVENTION

It is an object of the present invention to eliminate the above problems of the prior art, providing an improved transmission for the four-wheel drive automobiles, which permits a smooth switching-over to be accomplished between the two-wheel drive mode and the four-wheel drive mode while the automobile is actually running, and also comprises a path which permits a smooth return of the oil from the rear transmission section to the oil tank.

BRIEF DESCRIPTION OF THE DRAWINGS

Other objects and advantages of the present invention will become apparent from the description which follows hereinafter with reference to the accompanying drawings, in which.

DETAILED DESCRIPTION OF THE PREFERRED EMBODIMENTS

Figure 3:
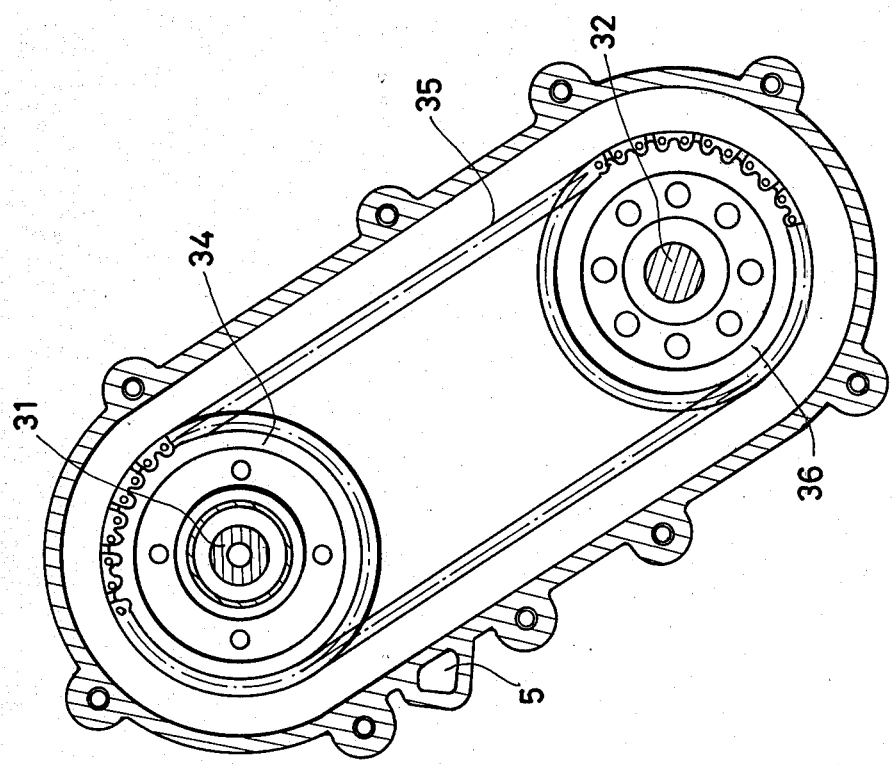
FIG. 3 is a sectional view taken along the line A—A in FIG. 2.
Figure 1:
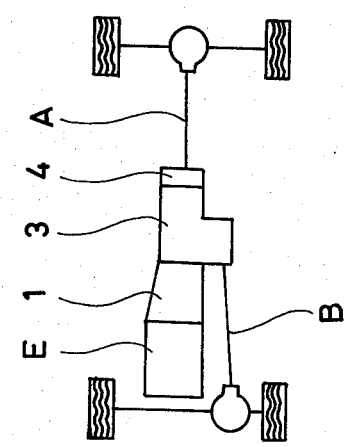
FIG. 1 is a schematic diagram showing the drive system for the four-wheel drive automobile.
Figure 2:
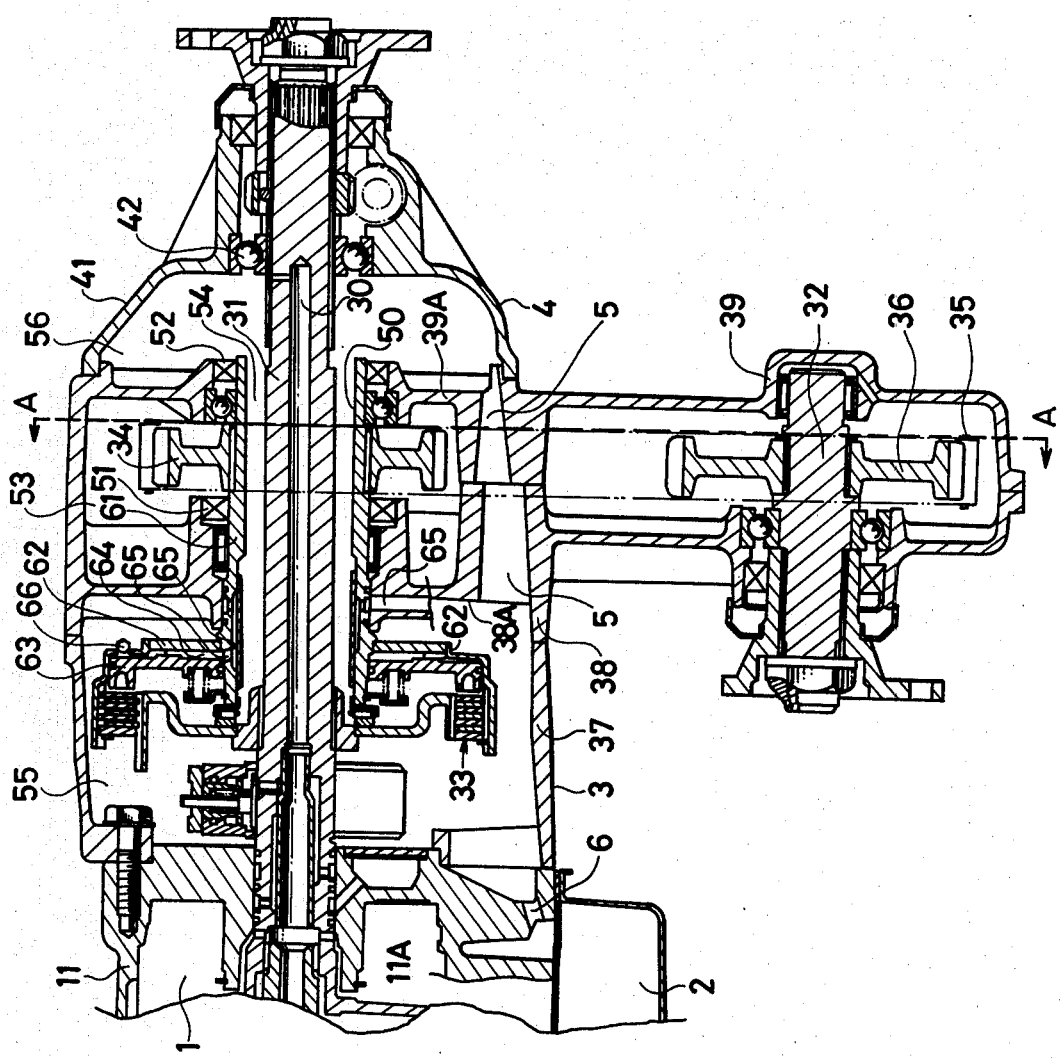
FIG. 2 is a sectional view of a preferred embodiment of the present invention.

The present invention is now illustrated in more detail with reference to a preferred embodiment thereof shown in the drawings.

Reference numeral E denotes an engine of an automobile, adjacent to which is provided a front transmission section in which a shifting through the entire speed range is done automatically in this embodiment. Reference numeral 11 designates a transmission case having a tank 2 rigidly secured under the bottom thereof. A transfer for a four-wheel drive generally designated by 3 is interposed between the front transmission section 1 and the rear transmission section 4 later to be described, and is enclosed in three separate cases 37, 38, and 39 as shown in this embodiment. The transfer 3 includes a first output shaft 31 coupled to a rear axle shaft A, a second output shaft 32 coupled to a front axle shaft B, a hydraulic multiplate clutch 33 operated to be engaged when the four-wheel drive mode is selected for imparting power to the front wheels, a sprocket 34 operatively to be associated with the first output shaft 31 when the clutch 33 is engaged, and a sprocket 36 linked to the sprocket 34 by way of a chain 35 which engages the second output shaft 32. The hydraulic clutch 33, for example, is operated by a hydraulic power cylinder assembly which includes a ring-like clutch cylinder 62 secured to a rotary sleeve 61 fitted in the sprocket 34, and a ring-like piston 63 slidably moving in the clutch cylinder 62. Reference numeral 66 refers to a relief valve fixed to the clutch cylinder 62. An oil chamber 64 in the hydraulic power cylinder assembly has hydralic operating fluid which is introduced into and drawn out of the chamber 64 through a fluid line 65 under the control of a manually operated lever or switch (not shown) located at the driver seat which switches over between the two-wheel drive mode and the four-wheel drive mode. The switching-over can be accomplished smoothly by selectively operating the manual lever or switch while the car is actually running, or even when any slippage may cause the rear wheels to be idling, because the hydraulic multiplate clutch provides a semiclutch function, and the hydraulic operating fluid is introduced so stepwise or gradually into the hydraulic power cylinder assembly as to permit the clutch plates to be engaged in the predetermined sequence, thereby resulting in a considerable shock reduction on engagement.

The earlier-mentioned rear transmission section designaged by 4 is provided behind the transfer 3, and is housed in a case 41 which is connected to the case 39. The case 41 has a bearing 42 which rotatably supports the output shaft 31 which has an oil path 30 extending axially therethrough from which lubricating oil is introduced into the case 41.

In the preferred embodiment of the present invention, an oil passage 5 is defined by the outer walls of the cases 38 and 39, extending through the separators 38A and 39A of the cases 38 and 39 and communicating between the case 41 and 37 through their respective bottoms. Oil seals 51 and 52 are interposed between the respective separators 38A and 39A and the shaft 50 to which the sprocket 34 is coupled, isolating the transfer space 53 from the front transmission section 55 and the rear transmission section 56 which are communicated with each other through the passage 54. Reference numeral 6 designates an oil path which extends through the separator 11A of the transmission case 11, communicating the bottom of the case 37 with the bottom of the case 11. Thus, the lubricating oil supplied to the rear transmission section can be drawn out of the case 41 through its bottom and enter the case 37 through the oil passage 5 between the case 38 and 39 and through the oil passage 6 back into the oil tank 2. As described herein above, the transfer space 53 is isolated by the oil seals 51 and 52 from the transmission spaces 55 and 56, so that the oil in the transmission space 55 and 56 can be prevented from entering the transfer space 53.

The oil passage for four-wheel drive clutch from transmission control circuit defined by the outer walls of the transfer case as shown and described above may have a varied form, such as for example a piping assembly separate from the transfer case and which is to be fixed to the transmission case.

Although the present invention has been illustrated with the preferred embodiment thereof, it should be understood that various changes and modifications may be made without departing from the spirit and scope of the present invention.

What is claimed as new and desired to be secured by Letters Patent of the United States is:

1. A transmission for a four-wheel drive vehicle having an engine, said transmission comprising:
   a front transmission section including gear means and located adjacent said engine, said front transmission section having a front transmission section output shaft rotatable in connection with an engine output shaft;
   a rear transmission section including a bearing supporting a first output shaft, said first output shaft directly engaging said front transmission section output shaft and supplying power to a first set of wheels;
   a transfer section positioned between said front and rear transmission sections and including means for fluidly isolating said transfer section from said front and rear transmission sections, said transfer section further including a first sprocket, a second output shaft mounted off-axis relative to said front transmission section output shaft and supplying power to a second set of wheels, a second sprocket fixed to said second output shaft and chain means rotatably linking said first and second sprockets;
   clutch means for selectively rotatably linking said first sprocket to said front transmission section output shaft;
   means for actuating said clutch for simultaneously providing power to both sets of wheels;
   casing means enclosing said front, rear and transfer sections, said casing means defining spaces in each said section;
   a lubricating oil passage formed at least in part in said front transmission section output shaft, said oil passage extending through said front, rear and transfer sections, one end of said oil passage communicating with an oil pressure source in said front transmission section and the other end of said oil passage communicating with said space of said rear transmission section; and
   a lubricating oil return passage formed in a portion of said casing means extending through said transfer section from said rear transmission section to said front transmission section, said oil return passage being in fluid isolation from said space of said transfer section, wherein one end of said oil return passage opens at the bottom of said rear transmission space and the other end of said oil return passage opens at a portion of said front transmission space which is lower than said one end of said oil return passage, whereby oil is returned by gravity through said oil return passage.

* * * * *